United States Patent [19]

Kunzmann et al.

[11] Patent Number: 4,811,892
[45] Date of Patent: Mar. 14, 1989

[54] METHOD FOR DIFFUSION WELDING UNDER ISOSTATIC PRESSURE

[75] Inventors: Dieter Kunzmann, Taufkirchen; Helmut Pertler, Haar; Helmut Seidl, Vagen, all of Fed. Rep. of Germany

[73] Assignee: Messerschmitt-Boelkow-Blohm GmbH, Munich, Fed. Rep. of Germany

[21] Appl. No.: 31,920

[22] Filed: Mar. 9, 1987

[30] Foreign Application Priority Data

Mar. 8, 1986 [DE] Fed. Rep. of Germany ....... 3607699

[51] Int. Cl.[4] .............................................. B23K 35/12
[52] U.S. Cl. ..................................... 228/194; 228/248
[58] Field of Search ............... 228/193, 194, 243, 254, 228/248

[56] References Cited

U.S. PATENT DOCUMENTS 2,456,418 12/1948 Imerman ............................ 228/248
4,008,844 2/1977 Duvall et al. ...................... 228/194
4,051,585 10/1977 Walker et al. ..................... 228/193
4,150,776 4/1979 Lisgourgues ...................... 228/194

FOREIGN PATENT DOCUMENTS 0090762 10/1983 European Pat. Off. .
0155490 2/1985 European Pat. Off. .
23424225 1/1986 Fed. Rep. of Germany .
0091855 8/1976 Japan ................................. 228/248
0154804 4/1982 Japan ................................. 228/194
0112985 7/1982 Japan ................................. 228/194
0167086 10/1983 Japan ................................. 228/194
0091222 10/1983 Japan ................................. 228/194

Primary Examiner—Nicholas P. Godici
Assistant Examiner—Karen Skillman
Attorney, Agent, or Firm—W. G. Fasse; D. H. Kane, Jr.

[57] ABSTRACT

Structural parts, particularly of complicated shape, are diffusion welded to each other under isostatic pressure to form permanent joints. A two phase operation is involved in the joint formation. In the first phase at least one of the welding joint forming surfaces of the two parts to be joined, is provided with a material which will form a metallurgical layer in the gap between the two surfaces forming the welding joint. The metallurgical layer forming material may be applied to one or both joint forming surfaces prior to assembly of the parts or the material may be introduced into the gap between the surfaces after the parts have been assembled. In both instances it is the aim to seal the gap prior to the second phase in which a diffusion welding is performed in a hot isostatic press.

14 Claims, 1 Drawing Sheet

METHOD FOR DIFFUSION WELDING UNDER ISOSTATIC PRESSURE

FIELD OF THE INVENTION

The invention relates to a method for permanently securing structural components to each other by a diffusion welding process. The invention is used, for example, for interconnecting components of an injection head of a rocket combustion chamber.

DESCRIPTION OF THE PRIOR ART

European Patent Publication (EU-OS) No. 0,155,490 discloses a method for interconnecting of work piece parts made of nickel based super alloys. In the known method, two parts of different nickel super alloys are connected to each other to form a work piece by filling a gap between the parts with a powder having a similar or the same composition as the parts. The powder forms a layer having a thickness of about 1 to 2 mm. The permanent connection of the parts to form a monolithic work piece, is accomplished by a hot pressing operation resulting in a diffusion joint. In such a diffusion joining process the diffusion is enhanced by the deformation caused by the high pressure in the connection zone. Such improvement of the diffusion is due to the intimate kneading of the material by the force components extending in the contact zone of the two parts to be joined. However, this known method is not usable for structural components which are not suitable for the pressure application even by means of pressure application devices or by means of press fits or shrink fits.

European Patent Publication No. 90,762 discloses ways to apply the required diffusion pressure even under difficult conditions by encasing the components to be joined. Under many circumstances such encasing is not possible.

OBJECTS OF THE INVENTION

In view of the foregoing it is the aim of the invention to achieve the following objects singly or in combination:

to provide a method for diffusion joining structural components even under difficult conditions, thereby avoiding the drawbacks of the prior art, especially where the structural components cannot transmit the pressure required for the diffusion;

to optimally interconnect complicated or difficult structural components or parts with each other by a diffusion welding using isostatic pressure;

to avoid complicated, trouble-prone jigs for the joining of such complicated parts or components; and to provide a substantial saving compared to other prior art welding methods, for example, the electron beam welding.

SUMMARY OF THE INVENTION

According to the invention structural components are joined to each other by diffusion welding involving the combination of the following steps. A metallurgical layer is applied to part or all of at least one of the joint forming surfaces of the parts to be connected with each other. The metallurgical layer has a melting point below the temperature required for the hot isostatic pressing. This temperature must be below the temperature at which the metallurgical layer would melt onto the welding joint forming surface or surfaces. When the two components are engaged with each other a joining gap is formed in which the metallurgical layer is located for sealing the joining gap. The metallurgical layer may be provided in several different ways prior to the assembly of two parts or after the assembly of these parts. The welding is performed by subjecting the assembled parts with said layer therebetween to a hot isostatic pressing process for accomplishing a material diffusion of said metallurgical layer through the joint forming surfaces.

The invention is basically a two-phase operation. In the first phase the metallurgical layer is applied to at least part of at least one of the surfaces which will form the welding joint, or to both surfaces. In this first phase and when the parts are assembled the joining gap is closed and sealed by the metallurgical layer. The second phase involves the diffusion welding in a hot isostatic press.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
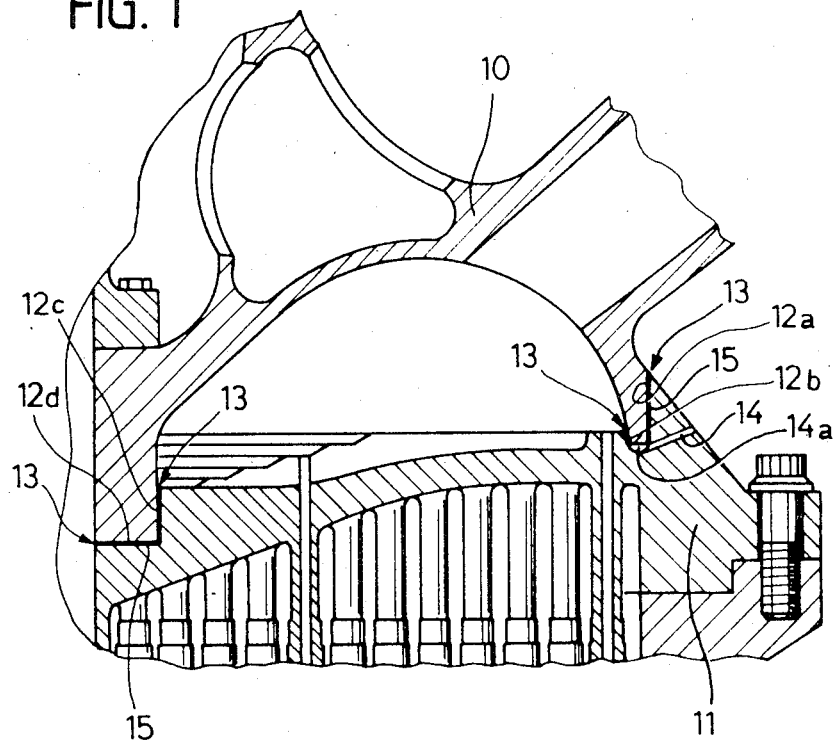
FIG. 1 is a partial sectional view through an injection head of a rocket propulsion plant, whereby the injection head has one pair of welding joint forming surfaces.
Figure 2:
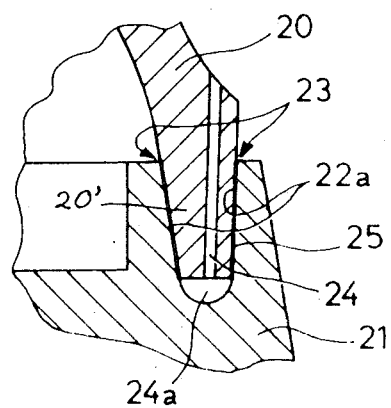
FIG. 2 is a partial cross-section through an injection head similiar to that of FIG. 1, however having two pairs of joint forming surfaces resulting from the insertion of a ring into a ring groove.

The nature and shape of the two embodiments of an injection head of a rocket propulsion plant shown in FIGS. 1 and 2 do not permit a pressure transmission through the parts, for example, by way of a shrinking stress or with the aid of respective jigs permitting the pressure application to the joint or joining surfaces. However, according to the invention even work pieces of complicated shape, as shown in the example embodiments, may be joined permanently and even at substantial savings. Comparing the invention to electron beam welding, the savings are about 50%. Further, trouble-prone jig structures are avoided altogether according to the invention.

In connection with the hot isostatic pressing, it is necessary that the pressure is applied from all sides evenly in order to avoid the shifting of the joint forming surfaces relative to each other. Such a shifting could prevent the welding joint formation since it may interfere with a proper diffusion at the joint forming surfaces.

The invention avoids these problems by providing, prior to any diffusion welding step, in the gap 13 between the joint forming surfaces 12a, 12b, 12c, and 12d of the parts 10, 11 to be joined, a metallurgical gap layer which initially seals the gap. This metallurgical layer is selected from a group of gap materials which have a normal melting point, under atmospheric or reduced pressure, below the given diffusion temperature needed for the hot isostatic pressing and which cannot be melted onto these surfaces by said given diffusion temperature under the isotatic pressure. In other words, these materials also have a higher melting point, under the isostatic pressure, above said diffusion temperature. Thus, these materials can melt if heated above the normal melting point under atmospheric or reduced pressure, but they cannot melt at the diffusion temperature prevailing at the same time when the isostatic pressure is applied and when the diffusion takes place. Gold, nickel phosphorus-alloys or nickel based solders have been found to satisfy these conditions and hence are suitable for the present purpose. These gap materials may be used in powder form, in wire form, or they may be deposited electrogalvanically or electrochemically or by sputtering or vapor deposition. The metallurgical gap layer so formed may cover part or the entire area of the joint forming surface or surfaces 12a, 12b, 12c, and 12d. The gap layer may be applied, prior to or after assembling the parts to be joined, to one or both of these surfaces. It is, however, essential that the application of the gap layer is so localized that the gap 13 is sealed by the metallurgical gap layer when the parts to be joined are assembled. Regardless whether the metallurgical gap layer has been applied prior to or after the parts 10, 11 have been assembled as shown in FIG. 1, any hollow spaces 14a that may result outside the seal in the gap 13 are vented to the atmosphere through a venting bore 14.

Where the material forming the metallurgical gap layer is applied into the gap 13 after the assembly, it is best to perform this phase in a vacuum having a reduced pressure within the range of $10^{-3}$ to $10^{-5}$ bar, and at a temperature within the range of 900° C. to 1250° C. Under these conditions a gravity enhanced capillary action seals the gap 13.

The temperature application prior to the hot isostatic pressing is such that the layer 15 provides a seal of the gap 13 while simultaneously the melting-on is prevented, for example, by an out diffusion of individual components of the layer or by a diffusion with the material of the parts 10, 11 to be diffusion welded. Such out-diffusion or diffusion raises the melting point of the layer so that the undesired melting-on during the subsequent hot isostatic pressing is prevented.

After the gap layer is formed and the parts 10, 11 have been assembled the actual hot isostatic pressing is performed to form the welded joint by a further material diffusion through the joint forming surfaces 12a to 12d. Thus, the present method permits the construction of work pieces having a complicated shape in which a pressure may be applied directly through the structural components which otherwise would not permit the application of a direct pressure by means of a jig or the like which applies the required pressure to the surfaces to be joined.

In the embodiment of FIG. 2 two structural parts 20 and 21 are to be joined for constructing an injection head of a rocket combustion chamber, whereby a so-called plug-in connection is involved. The dome forming part 20 has a rim 20' with conical side walls 22a. The part 21 has a respectively shaped conical groove 25 so that upon insertion of the rim 20' into the groove 25 gaps 23 are formed. The gaps 23 are again filled to an extent sufficient to achieve the mentioned sealing with the above described metallurgical layer, whereby any of the mentioned steps and possibly other steps may be used to form the gap layer. Any hollow spaces 24a formed outside the gaps 23 proper, are vented to the atmosphere by a vent channel 24. The gap layers in the gaps 23 are formed to such a thickness in the range of 2 $\mu$m to 100 $\mu$m, that the layer material will diffuse into the material of the parts 20, 21 during the subsequent hot isostatic pressing. A formation of the layer on the surfaces 22a and/or on the surface 25 by electrochemical deposition, has been found to be quite satisfactory. The gap width is generally in the range of 0.0 to 0.1 mm.

The material for forming the diffusion gap layer does not form any brittle phases with the material of the parts 10, 20, and 11, 21. It has been found that the formation of the solid solution during the diffusion of the layer material into the material of the structural components 10, 11 and 20, 21 results in an increase of the strength of the formed diffusion welded zones as compared to conventionally fused joints. Further, whether the metallurgical layer is applied before or after the assembly of the parts to be joined, will determine the manner or method of applying the material to form said metallurgical layer. In both possibilities it is important that the normal melting point at atmospheric pressure is sufficiently increased above the hot pressing temperature at the hot pressing isostatic pressure so that diffusion and not melting takes place during the hot isostatic pressing. Thus, it is possible that even the normal melting point could be above the hot pressing temperature. The hot pressing temperature and the isostatic pressure will depend on the materials used. However, hot pressing temperatures in the range of 980° C. to 1200° C., and isostatic gage pressures within the range of 1000 to 1500 bar have been found to be suitable.

Although the invention has been described with reference to specific example embodiments, it will be appreciated that it is intended to cover all modifications and equivalents within the scope of the appended claims.

What we claim is:

1. A method for a hot isostatic diffusion welding, at a given diffusion temperature, parts to each other under a given isostatic pressure, comprising the following steps:
   (a) providing each of said parts with at least one welding joint forming surface, whereby one surface faces the other surface for forming a welding gap when said parts are assembled,
   (b) providing in said welding gap a gap material for forming a metallurgical gap layer in said welding gap, said material of said metallurgical gap layer having a normal melting point, at atmospheric or reduced pressure, below said given diffusion temperature and a higher melting point above said given diffusion temperature at said given isostatic pressure,
   (c) sealing said welding gap by heating said gap material to a temperature above said normal melting point sufficient to cause at least a partial filling of the welding gap, e.g. by a gravity enhanced capillary action in said welding gap, prior to application of a hot isostatic pressing, and
   (d) subjecting the assembled parts with said metallurgical gap layer solid in said welding gap, to said diffusion temperature and to said isostatic pressure for performing a hot isostatic pressing to cause a diffusion of said metallurgical gap layer into said surfaces without remelting said metallurgical layer thereby permanently joining said parts.

2. The method of claim 1, wherein said material of said metallurgical layer is selected from the group consisting of gold, nickle-phosphorus alloys, and nickel based solders.

3. The method of claim 1, wherein said material of said metallurgical layer is applied to at least one of said welding joint forming surfaces prior to assembling said parts, whereby said applied metallurgical layer seals said welding gap when said parts are assembled.

4. The method of claim 3, wherein said metallurgical layer is applied to at least a portion of said one welding joint forming surface.

5. The method of claim 1, wherein said metallurgical layer is applied after assembling said parts, by at least partially filling said welding gap with said material forming said metallurgical layer.

6. The method of claim 5, wherein said material forming said metallurgical layer is filled into said welding gap by using a gravity enhanced capillary action prior to said hot isostatic pressing.

7. The method of claim 5, wherein said metallurgical layer is formed by filling a powder or wire forming said metallurgical layer into said welding gap prior to said hot isostatic pressing.

8. The method of claim 1, wherein said metallurgical layer is applied to at least a portion of at least one of said gap forming surfaces by electrogalvanical deposition.

9. The method of claim 1, wherein said metallurgical layer is applied to at least a portion of at least one of said gap forming surfaces by electrochemical deposition.

10. The method of claim 1, wherein said metallurgical layer is applied to at least a portion of at least one of said gap forming surfaces by vapor deposition.

11. The method of claim 1, wherein said metallurgical layer is applied to at least a portion of at least one of said gap forming surfaces by sputtering.

12. The method of claim 1, wherein said metallurgical layer is applied to at least a portion of at least one of said gap forming surfaces by a melting-on step in which said material forming said metallurgical layer is melted onto at least one surface at a temperature within the range of 900° C. to 1150° C., whereby a partial diffusion of said metallurgical layer into said parts raises the melting point of said metallurgical layer as compared to its first mentioned normal melting point.

13. The method of claim 12, wherein said melting-on step is performed in a vacuum having a reduced gage pressure within the range of $10^{-3}$ to $10^{-5}$ bar.

14. The method of claim 1, wherein said material forming said metallurgical layer is poured in powder form into said gap between said welding joint forming surface after said parts have been assembled, and wherein said hot isostatic pressing step is performed with said powder in said gap.

* * * * *